No. 751,355. PATENTED FEB. 2, 1904.
J. H. SMITH.
CAR BRAKE.
APPLICATION FILED JULY 22, 1903.
NO MODEL. 2 SHEETS—SHEET 2.
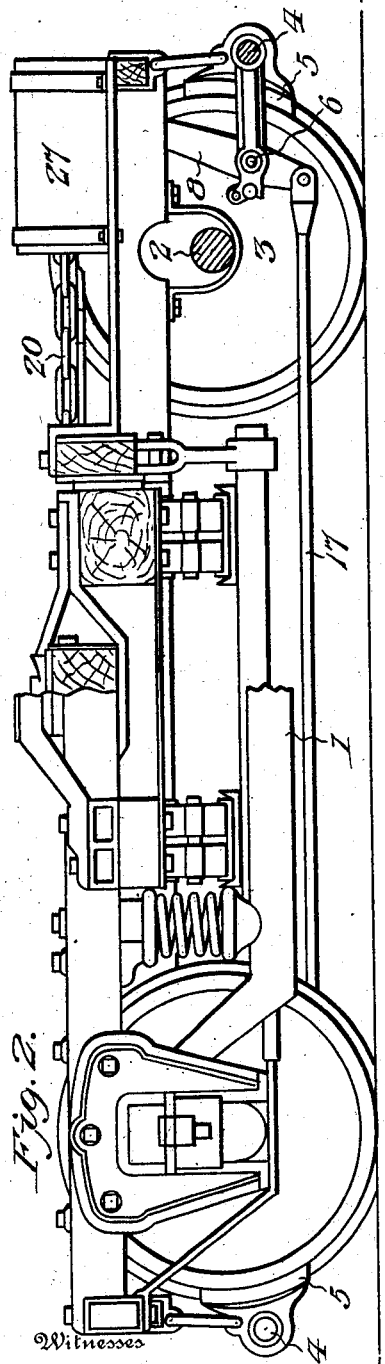
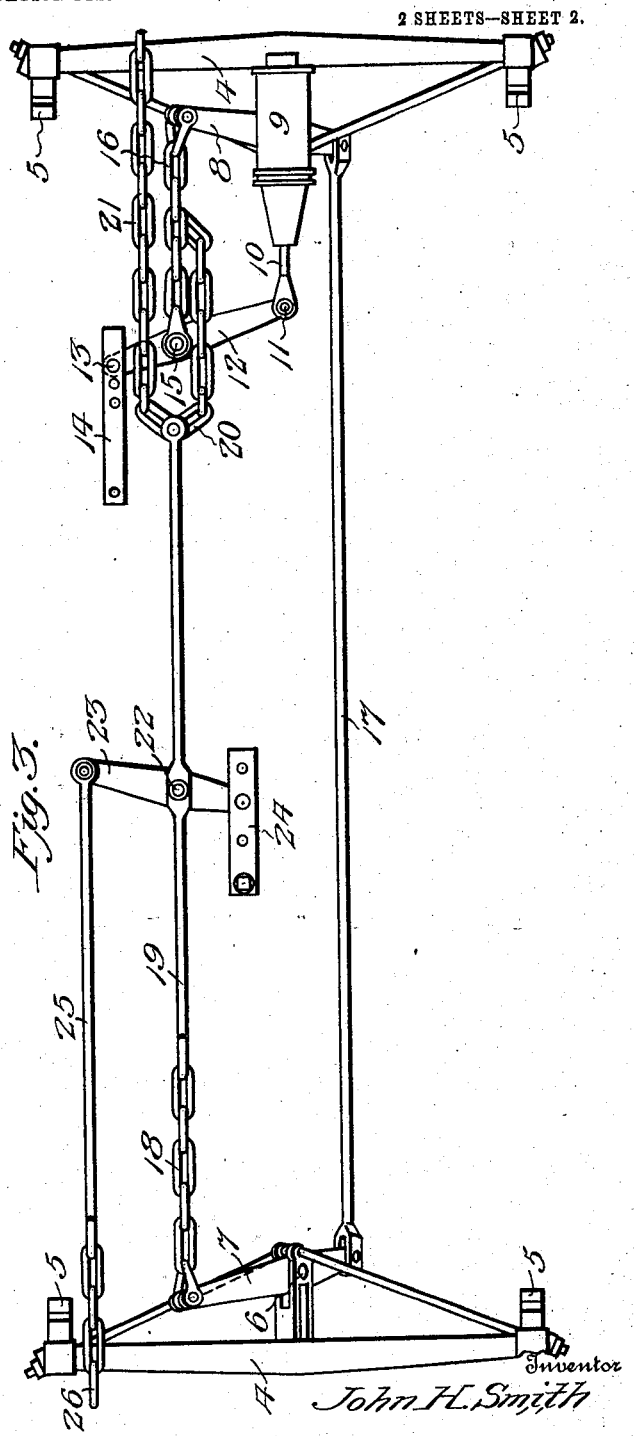
Witnesses
Edwin F. McKee
Chas. S. Hyer
Inventor
John H. Smith
By Victor J. Evans
Attorney No. 751,355. Patented February 2, 1904.

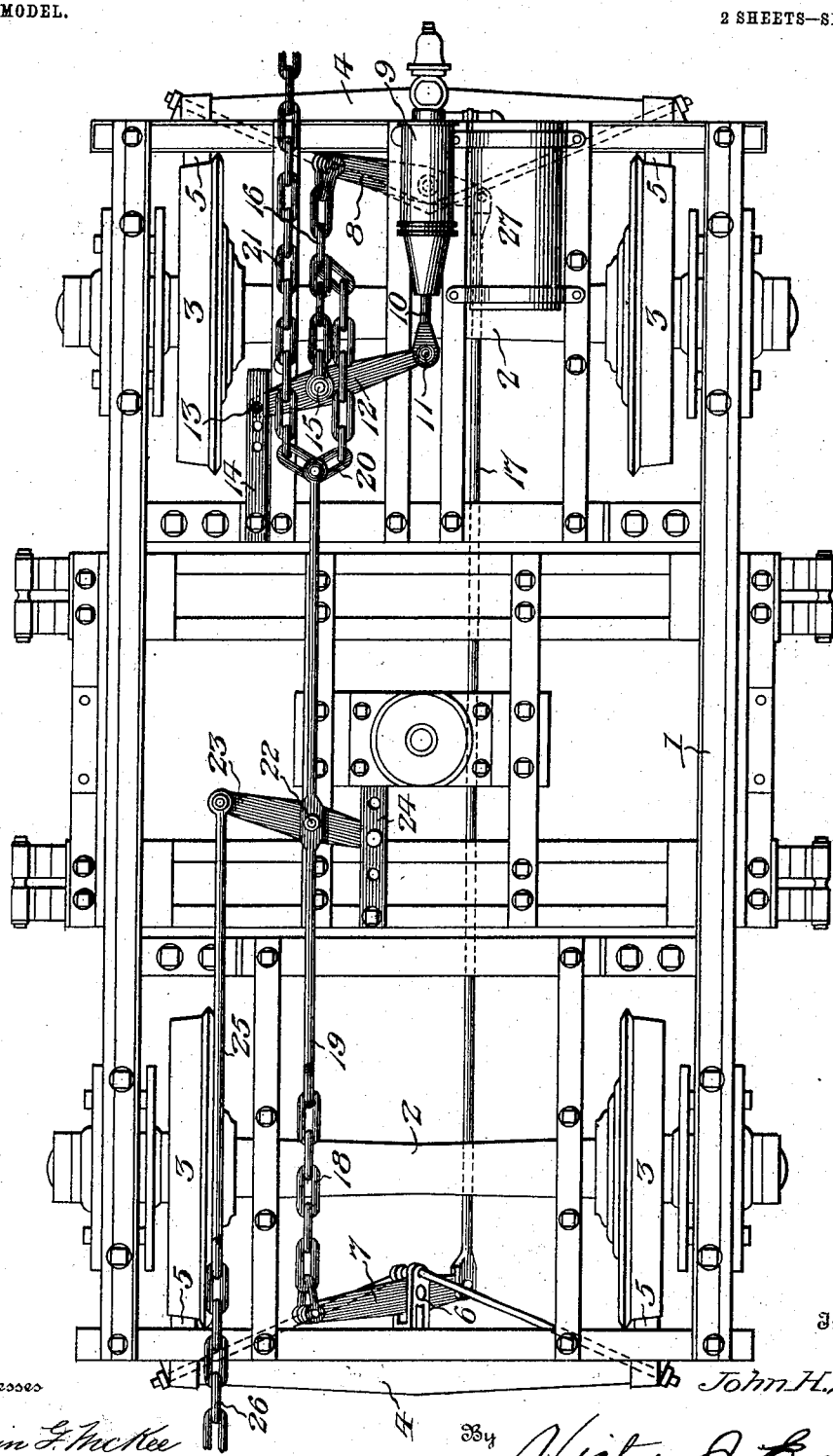

UNITED STATES PATENT OFFICE.

JOHN H. SMITH, OF MONTGOMERY, ALABAMA.

CAR-BRAKE.

SPECIFICATION forming part of Letters Patent No. 751,355, dated February 2, 1904.

Application filed July 22, 1903. Serial No. 166,614. (No model.)

*To all whom it may concern:*

Be it known that I, JOHN H. SMITH, a citizen of the United States, residing at Montgomery, in the county of Montgomery and State of Alabama, have invented new and useful Improvements in Car-Brakes, of which the following is a specification.

This invention relates to car-brakes, the object in view being to provide a simple and reliable brake mechanism applicable to railway-cars in general and adapted to be operated either by air or by hand, doing away with the usual grinding noise as the brakes are applied, causing the brake-shoes to simultaneously act on the wheels and equalize the strain, and overcoming the forward and backward jerking motion which is often experienced in the stopping of passenger-cars and otherwise simplifying and improving the brake mechanism. The construction is such that the brake-levers and other connections will not interfere with the rest of the apparatus on the bottom of the car, and in case one of the brake-beams fails to operate the rest of the brake mechanism will not be interfered with or rendered inoperative.

With the above general objects in view the invention consists in the novel construction, combination, and arrangement of parts, as hereinafter fully described, illustrated, and claimed.

In the accompanying drawings, Figure 1 is a plan view of an improved car-brake, showing the improved brake mechanism applied thereto. Fig. 2 is a side elevation of the same. Fig. 3 is a plan view of the brake mechanism *per se* detached from the truck.

Like reference-numerals designate corresponding parts in all the figures of the drawings.

Referring to the drawings, and particularly to Fig. 1, 1 designates a truck of the usual form and construction, 2 the car-axles, and 3 the car-wheels. At each end of the truck is arranged a brake-beam 4, each beam carrying a pair of brake-shoes 5, adapted to be moved into and out of contact with the wheels. Each beam is also provided with a bracket or arm 6, and to one of the beams is connected a brake-lever 7, while to the other beam is connected a corresponding brake-lever 8, the levers 7 and 8 being pivotally connected intermediate their ends, as illustrated in the drawings. At one end of the truck is arranged an air-cylinder 9, while projecting therefrom is the usual piston-rod 10, which in carrying out the present invention is connected pivotally at 11 to an air-brake lever 12, the opposite end of which is fulcrumed at 13 to a bracket 14, mounted on the truck. Connected at 15 to the lever 12 is a chain 16, the opposite end of which connects to one end of the brake-lever 8. To the opposite end of said lever 8 is attached a connecting-rod 17, which extends lengthwise of the brake and connects to the corresponding end of the brake-lever 7 at the opposite end of the truck. A chain 18 connects with the opposite end of the lever 7 and is attached to another connecting-rod 19, also extending lengthwise of the truck and having attached thereto a chain 20, which at its opposite end connects with the chain 16 at a point intermediate the ends of the latter. A hand-brake chain 21 also connects with the end of the connecting-rod 19, so as to enable the brake mechanism to be operated by hand, said chain 21 extending outward and connecting with the usual hand-brake shaft. (Not shown.)

At a point intermediate its ends the connecting-rod 19 is pivoted at 22 to a hand-brake lever 23, which is fulcrumed at one end to a bracket 24, mounted on the truck and pivotally connected at its opposite end to a rod 25, to the end of which is attached a chain 26, which extends to the end of the truck and connects with the hand-brake staff at that end of the truck.

27 designates an auxiliary air-cylinder in communication with the air-cylinder 9, above referred to.

When air is admitted to the cylinder 9, the piston-rod 10 is thrust outward, thereby rocking the lever 12, drawing on the chain 16, rocking the brake-lever 8, and thereby advancing the brake-beam 4 toward the wheels. At the same time the lever 8 draws upon the rod 17 and vibrates the brake-lever 7 at the opposite end of the truck, thus forcing the other brake-beam toward the pair of wheels in connection with which it operates, the lever 7 being held by the chain 18 and connecting-rod 19.

In applying the brakes by hand the chain 26 is wound upon the brake-staff, which has the effect of vibrating the lever 23, and thereby moving the connecting-rod 19, which by the movement of the chains 20 and 16 vibrates the lever 8 and through the connecting-rod 17 also vibrates the lever 7, thus simultaneously applying all the brake-shoes to the wheels. The brakes may be applied by hand from either end of the car-truck or the car-body under which the truck is mounted.

From the foregoing description it will be seen that all of the brake-shoes are simultaneously applied and the pressure equalized, thus doing away with the forward and backward jerking motion which has been found so objectionable in passenger-cars. It will also be seen that the brake-levers, rods, chains, and other connections are mounted entirely on the truck where they are out of the way and will not interfere with the apparatus under the car. This also results in doing away with the usual grinding noise which is caused by the brake connections coming in contact with other appliances on the bottom of the car, especially when the brakes are released and the brake connections slackened. The brake will also be found economical, powerful, and reliable in action. If desired, the main reservoir for supplying the cylinders of both trucks may be located under and mounted upon the car-body, in which case one triple valve will answer for both cylinders. The brake mechanism may be used either with a four-wheel or six-wheel truck, as may be necessary.

I do not desire to be limited to the details of construction and arrangement hereinabove described and accordingly reserve the right to make such changes in the form, proportion, and minor details of construction as properly fall within the scope of the appended claims.

Having thus described the invention, what is claimed as new is—

1. The combination with a car-truck, of brake-beams arranged at the extreme ends of the truck and provided with shoes arranged at the outer sides of the wheels, brake-levers pivoted intermediate their ends to said beams, a connecting-rod interposed between the corresponding ends of said brake-levers, a second connecting-rod attached to the end of one of the brake-levers, an air-brake lever, a connection between said lever and one of the brake-levers, a flexible connection extending from the last-named connection to the second connecting-rod, and an air-cylinder having its piston connected with said air-brake lever, substantially as and for the purpose set forth.

2. The combination with a car-truck, of brake-beams arranged at the extreme ends thereof, brake-levers pivoted intermediate their ends to said beams, a connecting-rod interposed between the corresponding ends of said levers, a second connecting-rod attached to the opposite end of one of said brake-levers, a chain extending from the second connecting-rod to the opposite end of the other brake-lever, and hand-brake chains connected with the second connecting-rod and extending toward the opposite ends of the truck, substantially as and for the purpose described.

3. The combination with a car-truck, of brake-beams arranged at the extreme ends thereof, brake-levers pivoted intermediate their ends to said beams, a connecting-rod interposed between the corresponding ends of the brake-levers, a second connecting-rod attached to the opposite end of the brake-lever, a chain interposed between said brake-rod and the opposite end of the other brake-lever, a hand-brake lever pivotally connected with the second connecting-rod, and a hand-brake connection attached to said hand-brake lever, substantially as and for the purpose set forth.

In testimony whereof I affix my signature in presence of two witnesses.

JOHN H. SMITH.

Witnesses:
 OWEN HARVEY,
 D. P. SETTLEMIRE.